(No Model.)
M. ARNDT.
GAS BALANCE FOR ASCERTAINING SPECIFIC GRAVITY OF GASES.
No. 527,397. Patented Oct. 16, 1894.
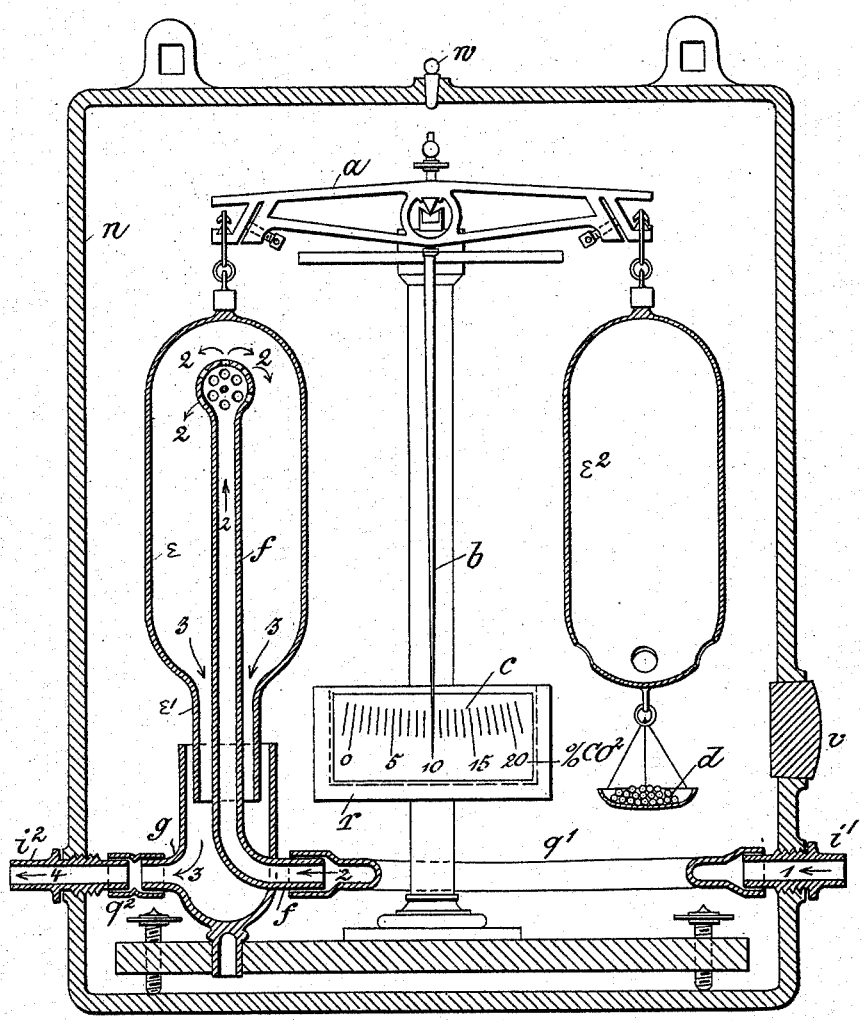

UNITED STATES PATENT OFFICE.

MAX ARNDT, OF AIX-LA-CHAPELLE, GERMANY.

GAS-BALANCE FOR ASCERTAINING SPECIFIC GRAVITY OF GASES.

SPECIFICATION forming part of Letters Patent No. 527,397, dated October 16, 1894.

Application filed February 18, 1893. Serial No. 462,933. (No model.)

*To all whom it may concern:*

Be it known that I, MAX ARNDT, a subject of the King of Prussia, German Emperor, and a resident of the city of Aix-la-Chapelle, in the Kingdom of Prussia, German Empire, have invented certain new and useful apparatus for ascertaining the percentage volume of a particular gas in a gaseous mixture and for ascertaining the weight of gases; and I do hereby declare that the following is a full, clear, and exact description of the invention, which will enable others skilled in the art to which it appertains to make and use the same.

My invention relates to an apparatus for ascertaining the proportion or percentage volume of a particular kind of gas in a gaseous mixture and for ascertaining the weight of gases, and my invention has for its object to render it practicable to determine the percentage volume of a particular kind of gas in a gaseous mixture and the weight of gases by means of a gas balance of simple construction which is located in an air tight chamber or casing with its several parts so arranged that, when the gases to be weighed flow through a vessel forming part of the balance, it may operate without resistance and with the greatest sensitiveness.

The apparatus of the invention is shown in the accompanying drawing in part sectional view.

$a$ is a balance beam carrying at one end a gas vessel $e$ provided with a neck $e'$ and open at bottom; $f$, a gas delivery pipe projecting upward into gas vessel $e$ and fixed and supported in vessel $g$ in such a way that upon the oscillation of balance beam $a$ the gas vessel may move freely up and down without coming in contact with the parts $f$ and $g$.

$b$ is a pointer rigidly fixed to beam $a$ so as to follow the movements of the gas balance. It oscillates in front of a divided plate or scale $c$ placed in a frame $r$ so as to be readily removable therefrom. The plate is divided either so as to indicate units of weight by the distances between its dividing lines or that these distances shall in conjunction with the pointer indicate a particular percentage volume of a particular kind of gas in a gaseous mixture. For example, in the drawing the scale $c$ has divisions to indicate a percentage volume of carbonic acid for the purpose of ascertaining the percentage of carbonic acid in smoke gases. The fluctuations which take place in the volume of the gases round fixed pipe $f$ by reason of the up and down motion of gas vessel $e$ are shown by pointer $b$ on scale $c$. The gas balance is inclosed in an air tight casing $n$ provided with one or more panes of glass for the purpose of observation. It has two tubular orifices, one $i'$ for the inlet and the other $i^2$ for the outlet of gases, the former connecting by a flexible tube $q'$ with fixed pipe $f$ and the latter by a flexible tube $q^2$ with vessel $g$.

The source of the gas supply is placed in communication with inlet $i'$ and a suction apparatus of any suitable kind in communication with outlet $i^2$. A portion of the air present in the casing is first drawn off, that is to say, the air is exhausted by suction to so much of a vacuum as corresponds to the strength of the suction at $i^2$. This rarefaction being obtained, the gases to be weighed can only pass through the apparatus in the direction shown by the arrows 1, 2, 3, 4, being drawn through inlet $i'$, flexible tube $q'$ and pipe $f$, passing out at the top of this latter into gas vessel $e$ which they fill and then out of this vessel into vessel $g$, through tube $q^2$ and outlet $i^2$, or the gases to be dealt with may be drawn through the apparatus in the reverse direction, entering at $i^2$ and leaving at $i'$. In any case the balance beam $a$ with the gas vessel $e$ may play without resistance as the pipe $f$ and vessel $g$ afford said gas vessel or its neck $e'$ sufficient free space for the up and down movement.

The gas vessel $e$ is so balanced either by a compensating vessel $e^2$ also open at the bottom and equivalent to the gas vessel in its capacity for upward driving, in conjunction with small weights $d$, or wholly by the latter, that pointer $b$ on beam $a$ moves to zero on the scale $c$ when atmospheric air is drawn through the apparatus. For the purpose of performing the balancing operation quickly and conveniently, the casing is provided with an aperture closable by a block or plate $v$ upon the removal of which the weights may be added to, or some of them removed, as required. Further, at the top of the casing there is an aperture fitted with a plug $w$ for the occasional admission of atmospheric air thereto. The gas vessel being open at the bottom so that the pressure within it is always the same as that without, fluctuations of pressure and barometrical readings have not to be considered in the use of this apparatus, likewise fluctuations of temperature do not affect its action, because the gases passing slowly through the apparatus at once take the temperature prevailing in the narrow gas passages.

The determination of the proportionate volume (percentage volume) of a particular kind of gas contained in a gaseous mixture is only practicable by means of the apparatus when the specific gravity of the gas sought for is different from the specific gravities of the other gases preponderating in the gaseous mixture but such other gases may be of like specific gravity among themselves. This, for instance, is the case with respect to the smoke gases of steam generator furnaces which gases are mainly made up of oxygen, nitrogen, carbonic oxide and carbonic acid. Of these, the first three are of nearly the same specific gravity approximating that of atmospheric air, equals 1. On the other hand the specific gravity of the carbonic acid equals 1.52 and is therefore about one half heavier than atmospheric air and a smoke gas mixture must consequently be heavier the greater its contents of carbonic acid. With perfect combustion of the carbon contained in the fuel and with the air of combustion measured in a theoretically accurate manner, the carbonic acid of the smoke gases amounts to about twenty per cent. of the total volume, but is less than this when the air of combustion is supplied in a larger quantity. If now the zero line of the scale $c$ has such a position that it coincides with the pointer $b$ when only atmospheric air is present in the gas vessel $e$; if, further, the end line or division of the scale $c$ has such a position that it coincides with the pointer $b$ when atmospheric air mixed with carbonic acid to the extent of twenty per cent. of the total volume, as determined by a chemical analysis, is drawn through the gas vessel $e$; and if further, the scale has twenty corresponding divisions, then the movement of the pointer from one division to another will correspond to the difference in the weight of the gaseous mixture in proportion to the percentage volume of carbonic acid, and accordingly, in the practical use of the apparatus, that is to say, when smoke gases are being conducted through the gas balance, the contents of carbonic acid, as indicated by the pointer in a sufficiently accurate manner for practical purposes, may at any time be read off from the scale $c$ direct. If, for instance, the pointer $b$ points to the division line marked 12 on the scale, this would indicate that the smoke gases being drawn through the gas vessel $e$ contain twelve per cent. in volume of carbonic acid, that is to say, the volume of the latter would amount to twelve per cent. of the whole volume of the smoke gas mixture, because the volume of the carbonic acid is of a certain greater weight which corresponds to a certain length of travel of the pointer over the scale $c$.

The length of travel of the pointer may be determined not only by the chemical analysis as before stated but also by calculating the weight of the gases with a certain quantity of carbonic acid and then loading the gas vessel $e$, charged with atmospheric air, with the resulting difference of weight.

If the smoke gases of a steam generator furnace when passing to the chimney have a temperature of 270° Celsius and twelve per cent. of their total volume consists of carbonic acid the loss of heat amounts only to about fifteen per cent., but if at the same temperature the carbonic acid contents amount, for example, to only four per cent. of the volume of the waste gases, this would show a loss of heat of about forty-five per cent. due in a great measure to the heating of an excessive quantity of air for the combustion of the fuel. Hence, it results that the gas balance herein described is of great importance as a controlling apparatus for steam generator and other furnaces and also for ascertaining the specific gravity of other gaseous mixtures by direct weighing.

What I claim as my invention, and desire to secure by Letters Patent, is—

In an apparatus for ascertaining the percentage volume of a particular kind of gas in a gaseous mixture and for ascertaining the weight of gases, a gas balance located in an air tight chamber and provided with a balance beam $a$, a balanced open vessel $e$ suspended from said balance beam for the reception of the gases to be weighed, a gas delivery pipe $f$ projecting into vessel $e$ and in connection through orifice $i'$ and tube $q'$ with a source of gas supply or with a suction apparatus outside the air tight chamber, and a vessel $g$ located underneath vessel $e$ and in connection through orifice $i^2$ and tube $q^2$ with a suction apparatus or with a source of gas supply outside the air tight chamber, said parts $f$ and $g$ being so placed as to allow of the free up and down movement of vessel $e$, substantially as described and shown.

In testimony whereof I sign this specification in the presence of two subscribing witnesses.

MAX ARNDT.

Witnesses:
 WILHELM MAAHN,
 JEAN HECKMANNS,
  *Aix-la-Chapelle.*